United States Patent [19]

Kagata

[11] 4,226,315
[45] Oct. 7, 1980

[54] FREE WHEEL HUB MECHANISM

[75] Inventor: Tooru Kagata, Toyota, Japan

[73] Assignee: Aisin Seiki Kabushiki Kaisha, Aichi, Japan

[21] Appl. No.: 928,265

[22] Filed: Jul. 26, 1978

[30] Foreign Application Priority Data

Jul. 27, 1977 [JP] Japan ................................ 52/100980

[51] Int. Cl.² .......................... F16D 3/34; B62B 27/00
[52] U.S. Cl. ........................................ 192/38; 192/35; 403/1
[58] Field of Search ................... 192/45, 36, 38, 12 D, 192/17 R, 35; 403/1

[56] References Cited

U.S. PATENT DOCUMENTS

| | | | |
|---|---|---|---|
| 3,055,471 | 9/1962 | Warn | 192/38 X |
| 3,184,258 | 5/1965 | Kapusta | 403/1 |
| 3,314,510 | 4/1967 | Zlotek | 192/35 X |
| 3,351,364 | 11/1967 | Warn et al. | 403/1 |
| 3,442,361 | 5/1969 | Hegar | 403/1 X |
| 3,476,226 | 11/1969 | Massey | 192/38 |
| 3,500,977 | 3/1970 | Gehrke | 192/45 |
| 3,732,957 | 5/1973 | McEwen | 192/45 |
| 3,753,479 | 8/1973 | Williams | 403/1 X |
| 3,987,880 | 10/1976 | Holland-Letz | 192/36 X |
| 4,163,486 | 8/1979 | Kagata | 403/1 |

FOREIGN PATENT DOCUMENTS 1440953 6/1976 United Kingdom ........................ 403/1

Primary Examiner—James T. McCall
Attorney, Agent, or Firm—Oblon, Fisher, Spivak, McClelland & Maier

[57] ABSTRACT

A free wheel hub mechanism is made up of a body secured to a wheel and an inner race rotatable with an axle shaft and having a plurality of cam surfaces at its outer periphery, a plurality of rollers held by a cage arranged between the body and the inner race, the rollers being urged outwards by the cam surfaces so as to be squeezed against the body when the inner race is rotated with the shaft. The squeezing of the rollers causes them to rotate with the inner race thereby to rotate the wheel. Also provided are means for restraining the rotation of the cage, including a plurality of shoes between which a plurality of projections provided on an innermost portion of the cage are arranged, a shoe receiving member secured to a non-rotatable spindle sleeve which houses the shaft and which has a receiving surface on which the shoes may slide, and an annular spring means urging the shoes against the receiving surface. In assembly, the shoes and shoe receiving member are assembled with the spring means, the shoe receiving member is secured to the spindle sleeve, and thereafter the projections of the cage, which is assembled between the body and the inner race, are positioned between the plurality of shoes.

5 Claims, 8 Drawing Figures

FREE WHEEL HUB MECHANISM

BACKGROUND OF THE INVENTION

1. Field of the Invention

This invention relates to a free wheel hub mechanism and more particularly to a free wheel hub mechanism for transmitting a driving force or torque from an axle shaft to wheels upon the application of driving force to the shaft.

2. Description of the Prior Art

Conventionally, various free wheel hub mechanisms have been proposed, for example such as disclosed in the U.S. Pat. No. 3,055,471. Such prior mechanisms, however, have disadvantages in assembling parts of the free wheel hub mechanism. For instance, each shoe and annular spring have to be assembled with their cage in advance of assembling on the spindle sleeve. This means that the ring secured to spindle sleeve must be press fit between the shoes with the result that the edge of the ring might damage the shoes.

SUMMARY OF THE INVENTION

Therefore, it is an object of the present invention to provide an improved free wheel hub mechanism which obviates the above drawbacks.

It is another object of the present invention to provide an improved free wheel hub mechanism which is simple in assembly.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

Figure 1:
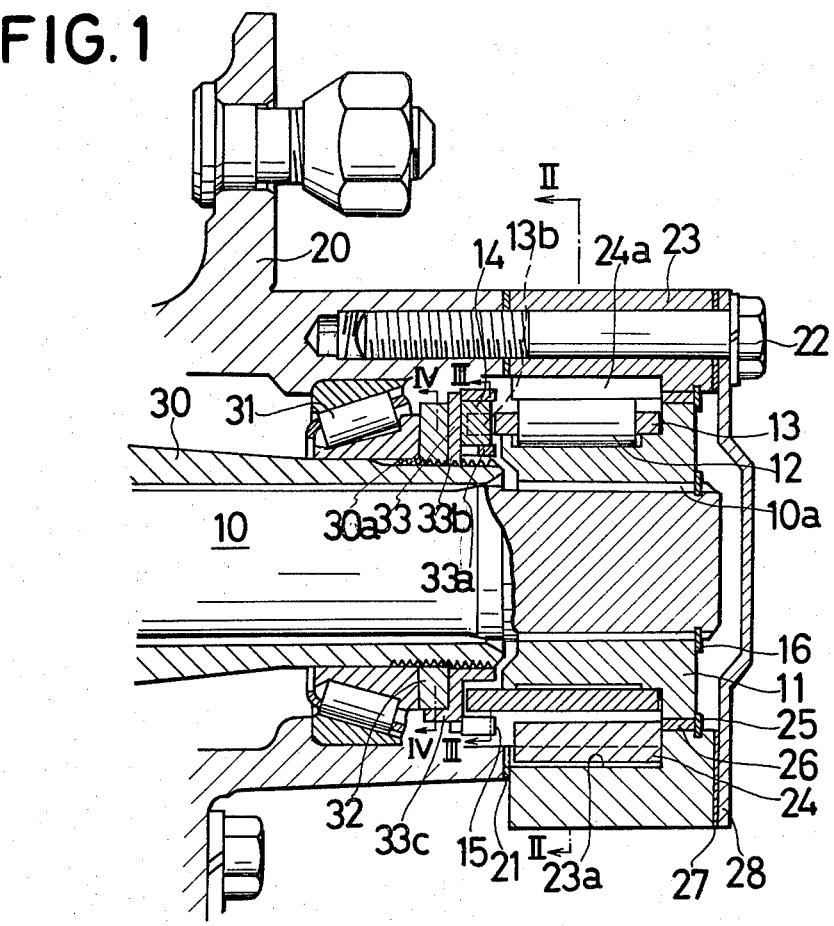
FIG. 1 is a cross sectional view of a free wheel hub mechanism illustrating a preferred embodiment of the present invention.

Referring now to FIG. 1, an axle shaft 10 passes through a non-rotatable spindle sleeve 30 and has a splined outer end 10a. Although not illustrated in FIG. 1, an inner end of the axle shaft 10 is operatively connected to a differential gear mechanism through means of universal joint. The differential gear mechanism is adapted to receive driving power from a vehicle engine through means of a transmission by which driving conditions are changed over to a two-wheel-drive mode of a vehicle from a four-wheel-drive mode, and vice versa.

A wheel hub 20 is rotatably mounted on the spindle sleeve 30 through means of a bearing 31 which is properly positioned by a nut 32. The wheel hub 20 is arranged so as to be assured a torque transmission from the axle shaft 10 through means of a free wheel hub mechanism, as will be clear hereinafter.

Figure 2:
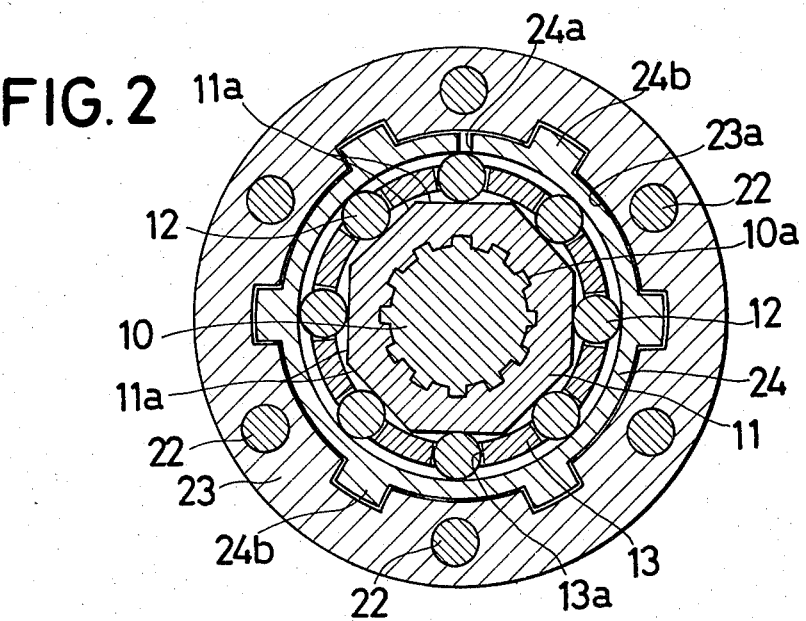
FIG. 2 is a cross sectional view taken along line II—II of FIG. 1.

The free wheel hub mechanism comprises an inner race 11 securely splined to the splined end 10a of the shaft 10, a body 23 secured to the wheel hub 20 with a gasket 21 by bolts 22, a spring band 24 positioned between the body 23 and the inner race 11, rollers or balls 12, and a cage 13 which receives the rollers 12 at equal intervals, as will be illustrated in FIGS. 1 and 2. Clips 16 and 25 prevent outer and inner peripheral ends of the inner race 11 from moving outwardly. The inner race 11 has at an outer and intermediate portion thereof eight plane cam surfaces 11a which are engageable with rollers 12, respectively, as will be best shown in FIG. 2. The body 23 is supported and mounted on the outer periphery of the inner race 11 by means of a metal bearing 26 which is press fit within the inner wall of the body 23. The body 23 also has at an inner periphery thereof concave portions 23a which receive a spring band 24 therein. A cover 28 is secured to the body 23 through a gasket 27 by bolts 22.

Figure 3:
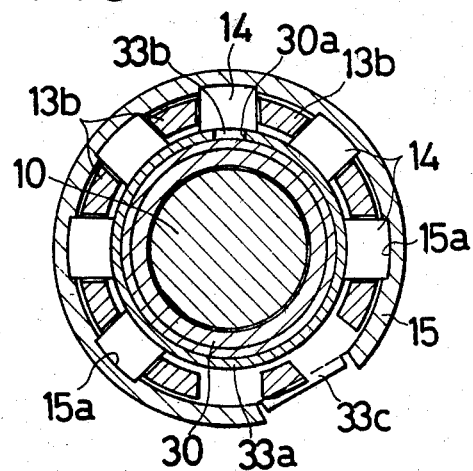
FIG. 3 is a cross sectional view taken along line III—III of FIG. 1.
Figure 4:
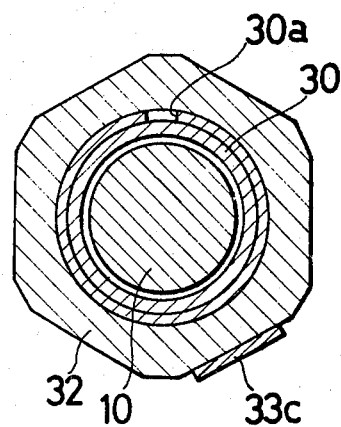
FIG. 4 is a cross sectional view taken along line IV—IV of FIG. 1.

The spring band 24 is of a cylindrical configuration having a slit 24a and has at an outer periphery thereof six axial extending projections 24b which are positioned within the concave portions 23a to thereby assure the torque transmission. Thus, the spring band 24 biases the rollers 12 towards the center of the axle shaft. Each roller 12 is rotatably arranged within each hole 13a of the cage 13 between the inner race 11 and the spring band 24. The rollers 12 are urged outwardly by the cam surfaces 11a when the inner race 11 is drivingly rotated by the shaft 10. Accordingly, the rollers 12 are squeezed against the inner surface of the spring band 24 to thereby cause the inner race 11 and the body 23 to rotate together. The cage 13 is of a cylindrical configuration having at an innermost end thereof eight projections 13b which are formed along the axial line. Each projection 13b is positioned within six shoes 14, as best shown in FIG. 3. Each shoe 14 is properly positioned within each recess 15a provided in an annular spring 15 and is urged inwardly by the biasing force of the spring 15. Thus, the shoes 14 are slidably pressed against a boss portion 33a of a shoe receiving member 33 which is non-rotatably mounted on the sleeve 30. The shoe receiving member 33 is assembled such that a projection 33b thereof is inserted within an axial groove 30a provided on the sleeve 30. The shoe receiving member 33 also has a bending portion 33c which is properly bent after assembling so that the nut 32 is prevented from rotating or loosening, as shown in FIG. 4.

Figure 5:
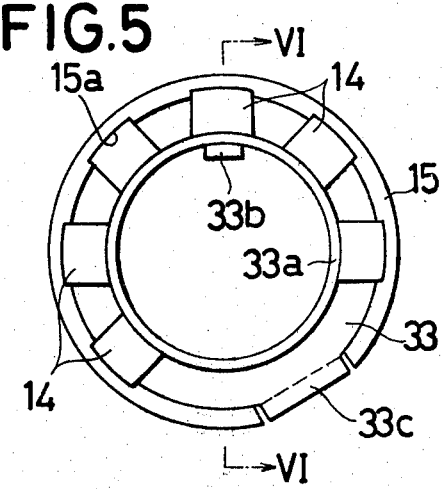
FIG. 5 is a front view illustrating an assembled shoe receiving member shoes, and spring of FIG. 1.
Figure 6:
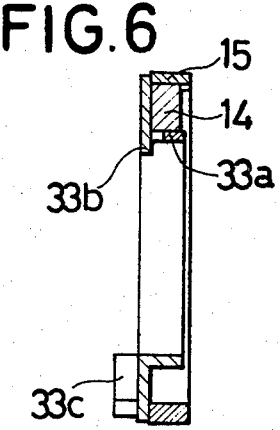
FIG. 6 is a cross sectional view taken along line VI—VI of FIG. 5.

In assembling the free wheel hub mechanism mentioned above, the shoe receiving member 33, shoes 14, and the spring 15 are firstly sub-assembled since the annular spring 15 has recesses 15a which properly receive the shoes, therein, as shown in FIGS. 5 and 6. After that, the above sub-assembly is mounted on the sleeve 30 such that the projection 33b of the shoe receiving member 33 is aligned with and inserted within the groove 30a of the sleeve 30, and the bending portion 33c is bent so as to engage with the nut 32. The inner race 11, the rollers 12, the cage 13, the spring band 24 and the body 23 are also sub-assembled, and the sub-assembly is properly positioned such that the inner race 11 is splined to the splines of the axle shaft 10 and each projection 13b of the cage 13 is positioned between each shoe 14. Finally, the inner race 11 is prevented from moving outwardly by the clip 16 and the body 23, with gasket 27 and cover 28, is secured to the wheel hub 20 by bolts 22.

In operation, when the transmission is positioned or set into a position to complete the two-wheel-drive mode of the vehicle, no driving force is imparted to the axle shaft 10 so that only a relatively small friction force will be generated by the biasing force of the spring band 24 itself between each roller 12 and the spring band 24. Thus, the spring band 24 is relatively rotatable on the rollers 12. When the wheel hub 20 is rotated, therefore, the body 23 secured to the wheel hub 20 and the spring band 24 engaged with the body 23 through means of projections 24b are free, or relatively rotatable, against the sleeve 30 and the inner race 11 by means of bearings 31 and 26.

When the transmission is manipulated into another position to complete the four-wheel-drive mode of vehicle, the axle shaft 10 receives the driving force and thus the inner race 11 is drivingly rotated. Under these conditions, each cam surface 11a of the inner race 11 urges each roller 12 outwardly against biasing force of the spring band 24, and each shoe 14 is frictionally slid on the outer surface of boss 33a of the shoe receiving member 33 thereby causing a lag of rotation of the cage 13. Thus, each roller 12 is squeezed between each cam surface 11a and inner surface of the spring band 24 so that the inner race 11 and the spring band 24 now act as one body. The driving force which is imparted to the axle shaft 10 is now transmitted to the wheel hub 20 through means of inner race 11, rollers 12, spring band 24, and body 23. In other words, all of inner race 11, rollers 12, cage 13, shoes 14, spring 15, spring band 24, body 23, and wheel hub 20 are rotated together with the shaft 10.

When the transfer is again manipulated into the first-named position to complete the two-wheel-drive mode of vehicle from the second-named position, the body 23 rotates faster than rotation of inner race 11 and thus each roller 12 is released from its squeezed condition. The spring band 24 is now freely rotating against each roller 12.

Figure 7:
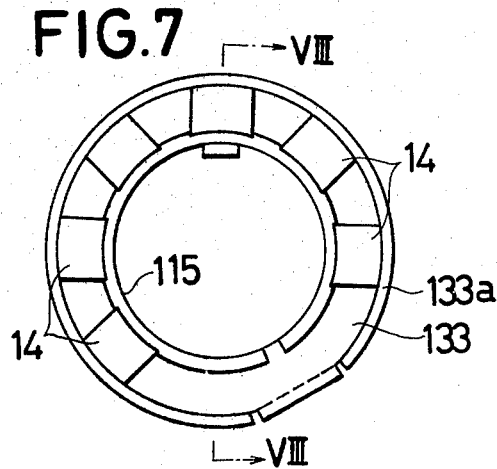
FIG. 7 is a view similar to FIG. 5, but showing a modification of the present invention.
Figure 8:
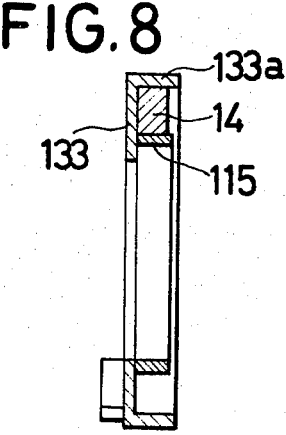
FIG. 8 is a cross sectional view taken along line VIII—VIII of FIG. 7.

In the above embodiment, the lag of rotation of the cage 13 will be caused by the above specific shoes 14, spring 15 and shoe receiving member 33, it would be apparent, however, that shapes or configurations of, and the number of, these parts could be properly modified. In FIGS. 7 and 8, showing one of these modifications, shoe receiving member 133 may have an outer cylindrical portion 133a, and a spring 115 which corresponds to the spring 15 in the previous embodiment may be arranged such that the spring 115 maintains the shoe receiving member 133 in its proper position and biases the member 133 so as to be pressed in contact with the cylindrical portion 133a.

In addition, although the spring band 24 is arranged between the inner race 11 and the body 23 in the previous embodiments, the diameter of each roller 12 may be increased without the inclusion of the spring band 24.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A free wheel hub mechanism comprising:
    a body secured to a wheel,
    an inner race secured to an axle shaft and rotatable therewith, said inner race having at outer periphery thereof a plurality of cam surfaces,
    a cage arranged between said body and said inner race and having a plurality of openings in which rollers are positioned,
    said rollers being outwardly urged by said cam surfaces so as to be squeezed against said body when said inner race rotates with said shaft together as one body, thereby causing said wheel to rotate together with said inner race, and
    means for restraining rotation of said cage, said restraining means including a plurality of shoes between which a plurality of cantilever projections provided on an innermost portion of said cage are arranged, a shoe receiving member secured to a non-rotatable spindle sleeve which houses said shaft therein and having a receiving surface on which said shoes are slidably received, and an annular spring means urging said shoes against said receiving surface and maintaining said shoes in their proper position,
    whereby after said shoes and said shoe receiving member are assembled by said spring means, said shoe receiving member is secured to said spindle sleeve, and thereafter said projections of said cage which is assembled within said body between said body and said inner race, are positioned between said plurality of shoes.

2. A free wheel hub mechanism as set forth in claim 1, wherein,
    said annular spring means has a plurality of recesses which receive ends of shoes, respectively, to thereby maintain said shoes at their proper positions.

3. A free wheel hub mechanism as set forth in claim 1, wherein, said shoe receiving member has a radial upstanding portion for axially positioning said shoes.

4. A free wheel hub mechanism as set forth in claim 1, wherein
    said shoe receiving member has a bending portion for preventing a nut from loosening.

5. A method for assembling a free wheel hub mechanism having a body, an inner race, a roller cage including a plurality of cantilever projections, a plurality of shoes, a shoe receiving member, a spindle sleeve and an annular spring means, said method comprising:
    assembling said shoes and shoe receiving member and said annular spring means into a first unit with said annular spring means urging said shoes against said shoe receiving member;
    mounting said first unit on said spindle sleeve;
    assembling said body, said inner race and said roller cage into a second unit; and
    positioning said second unit adjacent said first unit with said cantilever projections located between said shoes.

* * * * *